United States Patent Office 3,547,950

Patented Dec. 15, 1970

3,547,950

WATER-SOLUBLE ACRYLATE POLYMERS HAVING SKIN ADHERING QUALITIES

Robert Johns Gander, Whitehouse, N.J., assignor to Johnson & Johnson, a corporation of New Jersey No Drawing. Filed Nov. 23, 1966, Ser. No. 596,398
Int. Cl. C08f *45/30, 45/34;* A61f *13/00*
U.S. Cl. 260—33.2 16 Claims

ABSTRACT OF THE DISCLOSURE

Water-soluble acrylate polymers having skin-adhering qualities are prepared through the interpolymerization of dimethylaminoethyl methacrylate with esters of acrylic acid and/or esters of methacrylic acid the amine group being quaternized. Water-soluble cements, protective films, and pressure-sensitive adhesives are so formed. The dimethlyaminoethyl methacrylate content is critical after quaternization with respect to skin adherence, water solubility, and solubility in propellent solvents.

BACKGROUND OF THE INVENTION

The present invention is drawn to acrylate film-forming compositions and more particularly to acrylic film-forming compositions that will adhere to the human skin and are water soluble. The acrylate compositions of the present invention are particularly suitable for forming protective coatings on the skin wherein the film of polymer may, if desired, also include medicaments. The acrylate polymers of the present invention are also useful as cements for adhering to skin, dressings, and the like.

Acrylate polymer, as the term is used, refers to acrylate compositions wherein an ester of acrylic acid or methacrylic acid is polymerized or copolymerized with various comonomers containing a polymerizable ethylenic linkage. Where used as a protective film, the acrylate polymer would be applied to the surface to be protected in the form of a solution in an organic solvent, the solvent then being evaporated to leave a thin film of the acrylate polymer. When used as a cement, the polymer is applied as a relatively viscous solution of the polymer in an organic solvent either to the object being adhered or directly to the surface to which adherence is desired and the object then applied while the polymer is still in a tacky state. On evaporation of the solvent the polymer acts to adhere the object to the underlying surface to which it has been applied. Acrylate polymer compositions are particularly useful for skin application as the same are generally nonirritating to skin.

However, many acrylate polymers have relatively poor skin adherence, and polymers, which are essentially non-tacky when free of solvent, tend to have poor skin adherence particularly over extended periods of time. Also as acrylate polymers are generally insoluble in water, any protective film or cement used on the skin where the polymer is of such nature as to give reasonably good skin adherence must then be removed from the skin by organic solvents such, for example, as acetone, ethyl acetate, or methyl ethyl ketone which solvents are frequently not available at the time removal is desired.

SUMMARY OF THE INVENTION

It is an object of the present invention to prepare film-forming acrylate polymer compositions which are water soluble and can be readily removed from a surface to which they may be applied by washing with water. It is a further object of the present invention to prepare water-soluble acrylate film-forming compositions which when applied to the skin give good skin adherence over extended periods of time so that the same can be used for forming protective film coatings on the skin or for cementing dressings and the like on underlying skin surface.

The water-soluble film-forming acrylate polymers of the present invention are prepared by polymerizing dimethylaminoethyl methacrylate with esters of acrylic acid and/or esters of methacrylic acid alone or simultaneously with the inclusion of other acrylic monomers and then quaternizing the amine group through reaction with a quaternizing agent of the type hereinafter more fully described. The dimethylaminoethyl methacrylate should be present in amounts of 10 to 40 percent by weight of the total monomer content and the acrylate ester and/or methacrylate ester component should be present in amounts of at least 50 percent by weight of the free base polymer.

The acrylate esters and the methacrylate esters found suitable are the esters of alkyl alcohols containing 4 to 12 carbon atoms. These esters can be represented by the general formula:

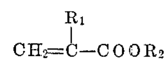

in which $R_1$ is H or $CH_3$, and $R_2$ is an alkyl chain of 1 to 12 carbon content.

DESCRIPTION OF PREFERRED EMBODIMENT

Some examples of esters of acrylic acid and esters of methacrylic acid which may be used in practicing the present invention are the esters of these acids with alkyl alcohols such as n-butanol, isobutanol, n-pentanol, isopentanol, 2-methylbutanol, 1-methylbutanol, 1-methylpentanol, 2-methylpentanol, 3-methylpentanol, 2-ethylbutanol, pentanol-3, 3,3,5-trimethylhexanol, heptanol-3, isooctanol, n-decanol, n-dodecanol, n-heptanol, 2-ethylhexanol, n-hexanol, n-octanol, diisobutyl carbinol, 2,6,8-trimethyl-4-nonanol.

Other acrylic monomers may be added to modify the skin-adherent qualities if desired. Thus, for example some of the preferred film-forming polymer compositions are obtained by including on a solids basis from 10 to 30 percent by weight N-tert.-butylacrylamide in the monomer mix in preparing the polymer as the inclusion of this monomer appears to improve the long term skin adherence of the resulting acrylate polymer. However, the acrylate polymer should still contain the minimum amounts of acrylate ester and dimethylaminoethyl methacrylate heretofore mentioned polymerized together in the final adhesive film-forming polymer compositions.

As quaternizing agents, one may use any of the alkyl halides and alkyl sulfates wherein the alkyl group has a carbon content of no more than 8 carbons. Some quaternizing agents of this general type are, for example, dimethyl sulfate, diethyl sulfate, di-n-butyl sulfate, di-n-hexyl sulfate, di-n-octyl sulfate, iodomethane, iodoethane, 1-iodohexane, 1-iodooctane, bromomethane, bromoethane, 1-bromopropane, 1-bromobutane, 1-bromoheptane.

Although any of the quaternizing agents of the group alkyl halides and alkyl sulfates wherein the alkyl group contains no more than 8 carbons may be used to quaternize the amine of the polymer to produce water-soluble skin-adhering products, the selection of the quaternizing agent will depend somewhat on the amount of dimethylaminoethyl methacrylate monomer interpolymerized in the polymer as some of the quaternizing agents are found to have a somewhat greater solubilizing effect than others. Quaternizing agents in which the alkyl group is solely hydrocarbon generally require a slightly greater amount of dimethylaminoethyl methacrylate present in the polymer than do quaternizing agents in which the alkyl group contains solubilizing groups such as haloacetates illustrated, for example, by chloroacetate and bromoacetate, or a benzene ring illustrated, for example, by benzyl chloride. Thus in the practice of the present invention quaternizing agents having alkyl groups composed entirely of hydrogen and carbon should not be used with polymers in which the dimethylaminoethyl methacrylate is present in amounts less than about 17 percent by weight of the polymer.

In preparing the polymer compositions of the present invention, the preferred practice is to first prepare the polymer through polymerization of the monomer mix and then add the quaternizing agent to the polymer solution to react the same with the polymer and quaternize the amine nitrogens present. The quaternizing agent is added in excess over the theoretical amount necessary to convert all of the amine nitrogens present.

However, formation of the polymer quaternary salts from the amine polymer is not a quantitative conversion, the degree of quaternization ranging from about 70 to about 90 percent. Thus, there are present two nitrogen species in the quaternized polymers so formed, there being the unchanged tertiary amine represented by the radical $—N(CH_3)_2$ and the quaternary ammonium salt represented by the radical

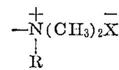

X representing the halide or sulfate ion, and R representing the alkyl group of the quaternizing agent.

the free base polymer while with 30 percent by weight no solubility is obtained.

TABLE I

| Polymer EHA | Comp. percent | | Neut. equiv.[1] free base | Rel. vis.[1] free base | Quaternizing agent | Approx. sol.[1] time in water, min. | Skin adherence[1] | |
|---|---|---|---|---|---|---|---|---|
| | BACA | DMAEMA | | | | | 24 hr. | 48 hr. |
| 70 | 10 | 20 | 780 | 1.29 | Methyl chloroacetate | 5 | 82 | 64 |
| 65 | 10 | 25 | 614 | 1.28 | do | 5 | 95 | 84 |
| 55 | 10 | 35 | 634 | 1.29 | do | 2 | 52 | 16 |
| 70 | 10 | 20 | 780 | 1.29 | 1-bromopentane | 25 | 74 | 48 |
| 55 | 10 | 35 | 434 | 1.29 | do | 2 | 52 | 27 |
| 70 | 10 | 20 | 780 | 1.29 | Benzyl chloride | 5 | 78 | 56 |
| 65 | 10 | 25 | 614 | 1.28 | do | 5 | 86 | 70 |
| 70 | 10 | 20 | 780 | 1.29 | Dimethyl sulfate | 15 | 74 | 48 |
| 55 | 10 | 35 | 434 | 1.29 | do | 4 | 43 | 10 |
| 60 | 10 | 30 | 513 | 1.28 | 1-bromododecane | | | |
| 50 | 10 | 40 | 377 | 1.29 | do | (2) | 63 | 29 |

[1] Determined as illustrated in Example I.
[2] >24 hrs.

Abbreviations are as follows:
EHA: 2-ethylhexyl acrylate;
BACA: N-tert.-butylacrylamide;
DMAEMA: Dimethylaminoethyl methacrylate.

As previously indicated, the water-soluble film-forming acrylate compositions of the present invention are applied in the form of an organic solution. Where the composition is to be used for forming a protective film on the skin, it is generally preferred to use a solvent having a relatively low boiling point so that the solvent will evaporate rapidly, leaving a dry protective film of the polymer on the skin of the patient. Also, for adhesive application it is frequently desirable to have a rapidly drying adhesive. For rapidly drying adhesives it is generally preferred to use a solvent having a boiling point of below 70 degrees Fahrenheit.

A preferred manner of applying the quaternized film-forming acrylate compositions is by means of aerosol propellents. The most rapid drying is obtained where a propellent is used which is also a solvent for the polymer composition. Such propellents are hereinafter referred to as propellent solvents. It has been found that although the initial free base polymer may be readily soluble in the propellent solvent, when the free base polymer has been quaternized through reaction with a quaternizing agent, it solubility in the propellent solvent may be appreciably affected particularly with the higher amounts of dimethylaminoethyl methacrylate in the polymer. This is well illustrated in the following table where trichlorofluoromethane ($CCl_3F$) is used as the propellent solvent.

TABLE II

| Polymer composition, percent | | | Neut. equiv. free base | Rel. visc. free base | Quaternizing agent | Water sol. | Sol. in 65 Freon 71 35 Freon 72 |
|---|---|---|---|---|---|---|---|
| EHA | BACA | DMAEMA | | | | | |
| 80 | 10 | 10 | 1,560 | 1.35 | Methyl Chloroacetate | Insol. | Sol. |
| 65 | 10 | 25 | 614 | 1.28 | do | Sol. | Sol. |
| 60 | 10 | 30 | 518 | 1.28 | do | Sol. | Insol. |
| 75 | 10 | 15 | 1,035 | 1.31 | 1-bromopentane | Insol. | Sol. |
| 65 | 10 | 25 | 614 | 1.28 | do | Sol. | Sol. |
| 60 | 10 | 30 | 518 | 1.28 | do | Sol. | Insol. |
| 75 | 10 | 15 | 1,035 | 1.31 | Benzyl chloride | Sol. | Sol. |
| 70 | 10 | 20 | 780 | 1.29 | do | Sol. | Sol. |
| 65 | 10 | 25 | 614 | 1.28 | do | Sol. | Insol. |
| 75 | 10 | 15 | 1,035 | 1.31 | Dimethyl sulfate | Insol. | Sol. |
| 65 | 10 | 25 | 614 | 1.28 | do | Sol. | Sol. |
| 60 | 10 | 30 | 518 | 1.28 | do | Sol. | Insol. |
| 50 | 10 | 40 | 377 | 1.29 | 1-bromododecane | Sol. | Sol. |
| 40 | 10 | 50 | 310 | 1.26 | do | Sol. | Insol. |

Abbreviations are as follows:
EHA: 2-ethylhexyl acrylate;
BACA: N-tert.-butylacrylamide;
DMAEMA: Dimethylaminoethyl methacrylate;
Freon 11: Trichlorofluoromethane;
Freon 12: Dichlorofluoromethane.

The effect of the amount of dimethylaminoethyl methacrylate present in the polymer on the solubility and skin adherence of the quaternized polymer is well illustrated by the following table. The table also illustrates the effect of the alkyl group in the quaternizing agent. It will be noted, on considering the values given in the table, that the acrylate polymers quaternized with 1-bromododecane, in which the alkyl group is greater than 8, required as much as 24 hours before the polymer could be dissolved in water even with the dimethylaminoethyl methacrylate present in amounts of 40 percent by weight of Because of the increasing insolubility of the quaternized acrylate polymer in propellant solvents with increasing amounts of dimethylaminoethyl methacrylate, the dimethylaminoethyl methacrylate content of the polymer should be limited to no more than about 27.5 percent by weight of the free base polymer if the only solvent for the quaternized acrylate polymer is to be a propellant solvent. The term "solvent" for the quaternized acrylate polymer is limited to actual solvents therefor, that is organic liquids into which the quaternized acrylate polymer will dissolve at ordinary room temperatures and does not include other liquids which may be in a propellent system such, for example, as dichlorodifluoromethane ($CCl_2F_2$) which in and of themselves are not solvents for the quaternized acrylate polymers but which are miscible with organic solutions of the polymers.

Where difficulty is encountered in solubilizing the quaternized acrylate polymer in the propellent solvent, because of relatively high dimethylaminoethyl methacrylate content, the same can be solubilized by adding to the propellent solvent a small amount of any of the solvating agents: methanol, ethanol, or propanol. The solvating agent should not be added in amounts of more than about 5 percent by weight based on solvents if rapid drying of the film is desired as its presence in amounts much in excess of about 5 percent substantially slows downs the drying rate.

It should be noted that the amount of the solvating agent used is substantially less than required to actually dissolve the polymer in any of the materials methanol, ethanol, or propanol. Thus the solution is primarily a solution of the polymer in the propellent solvent, the solvating agent only aiding in obtaining the polymer in solution and not acting as the solvent itself.

As previously indicated, the polymers of the present invention are preferably applied by dispensing the same under pressure from a pressurized container wherein the polymer is present in the form of a solution in one of the propellents used. The propellent pressure in the container is preferably in the range of about 20–60 pounds per square inch gauge at a temperature of 75 degress Fahrenheit. Where the propellent solvent used will not by itself give a sufficiently high total pressure, other propellents are employed together with the solvent propellent to give the pressure desired.

As previously indicated, in the preferred practice of the present invention the film-forming polymer is dissolved in a propellent solvent. The term propellent, as herein used, is used in the conventional sense. A propellent is, for example, defined in Aerosols: Science and Technology, Interscience Publishers, Inc., New York, N.Y., page 214, as "A liquefied gas with a vapor pressure greater than atmospheric pressure (14.7 p.s.i.a.) at a temperature of 105° F." This definition is sufficiently broad to include some liquids which, used alone would not function as propellents, but in solution with selected liquefied gases make satisfactory pressurized systems. An example is methylene chloride whose boiling point is 105° F., at which temperature its vapor pressure equals atmospheric pressure. Thus it just falls within the limits of the definition. At ordinary room temperature, methylene chloride has a vapor pressure below atmospheric pressure and cannot function as a propellent but, when dissolved in a liquid of high vapor pressure, it will give resultant pressures satisfactory for application to an aerosol system.

Propellent solvents are those propellents which are also solvents for the alkyl acrylate and alkyl methacrylate film-forming polymers used.

Propellent solvents generally available are trichlorofluoromethane ($CCl_3F$), generally referred to in the trade as Propellent 11; dichlorofluoromethane ($CHCl_2F$), generally referred to in the trade as Propellent 21; 1,1,2-trichloro-1,2 2-difluoroethane ($CCl_2FCClF_2$), generally referred to in the trade as Propellent 113; 1,1-difluoro-1-chloroethane ($CH_3CClF_2$) generally referred to in the trade as Genetron 142b; vinyl chloride ($CH_2{=}CHCl$); and dimethyl ether ($CH_3OCH_3$).

Of these propellent solvents, the one preferred and the one found to give the best results with the widest range of alkyl acrylate and alkyl methacrylate film-forming polymers is Propellent 11. Propellent 11 is a good solvent for the film-forming polymers and is readily released by the polymers after being dispensed from the pressurized container.

Where Propellent 11 is used as the propellent solvent, it is preferably used together with another propellent, such as Propellent 12, in order to increase the pressure in the container to the desired 20 to 60 pounds per square inch gauge at 75° F. Propellent 12 refers to the propellent chemical dichlorodifluoromethane $$(CCl_2F_2)$$

With respect to the other propellent solvents referred to, Propellent 21 is a good solvent for film-forming resins suitable for use in the present invention. This particular propellent solvent, however, has the characteristic that is retained somewhat more tenaciously by the alkyl acrylate and alkyl methacrylate polymers than is Propellent 11 even though it boils at a substantially lower temperature than Propellent 11. This is apparently due to the strong associative hydrogen bonding between Propellent 21 and the resin molecules. Accordingly, for the more rapid drying Propellent 11 is preferred.

The vinyl chloride propellent is a good solvent for the alkyl acrylate and alkyl methacrylate polymers. However, the vinyl chloride propellent has the characteristic of being retained more tenaciously by the dissolved polymer, after the same has been sprayed into a film in much the same manner as is Propellent 21. It, accordingly, gives a much slower drying rate for the polymer film despite the fact that the vinyl chloride boils at +7.9° F. As the vinyl chloride has a gauge pressure of 34 pounds per square inch at 70° F., it can be used alone without a further propellent. However, the flammable nature of the vinyl chloride together with its tendency to be retained by the alkyl acrylate and alkyl methacrylate polymers makes it generally unsuitable for use alone as the propellent solvent in the preferred formulations of the present invention.

Dimethyl ether is another fairly good propellent solvent which is a relatively good solvent for the alkyl acrylate and alkyl methacrylate polymers. The dimethyl ether has a boiling point of −12.7° F. and a gauge pressure at 70° F. of 60 pounds per square inch. However, the dimethyl ether is flammable and has an etheral odor, both of which properties make it generally unsuitable for surgical purposes when used alone particularly where sparks or open flames may be encountered.

As is clear from the above, the preferred propellent solvent is Propellent 11. The other propellent solvents can, however, be used, particularly where used in blends with Propellent 11. They may also, in some instances, be used without any Propellent 11 being present. However, Propellent 11 is preferred, either as the sole propellent solvent or as the major propellent solvent where blended with any of the other propellent solvents mentioned. The blending of Propellent 11 with vinyl chloride best illustrates some of the advantages obtained by using at least some Propellent 11. Vinyl chloride has been indicated as being flammable and, accordingly, generally undesirable in the preferred compositions. However, the vinyl chloride can be used in minor amounts in blends with Propellent 11 and non-solvent Propellent 12 to give satisfactory nonflammable propellent compositions. For example, the following formulations are nonflammable and give the indicated pressure at 70° F.:

| Weight percent | | | Pressure at 70° F., p.s.i. |
|---|---|---|---|
| Prop. 11 | Prop. 12 | VlCl | |
| 43 | 37 | 20 | 39 |
| 39 | 39 | 22 | 36.5 |
| 45 | 20 | 35 | 34 |
| | 65 | 35 | 61 |
| | 80 | 20 | 66 |

Although various propellent blends can be used as long as they contain a solvent propellent and give a pressure of about 20 to 60 pounds per square inch gauge in the pressurized container at a temperature of 75° F., the propellent formulation preferred is 40 to 70 weight percent solvent Propellent 11 and 60 to 30 weight percent non-solvent Propellent 12. In further describing the invention, propellent mixtures consisting of 50 weight percent solvent Propellent 11 and 50 weight percent non-solvent Propellent 12 will be used.

Although the quaternized film-forming polymer compositions of the present invention are solubilized in propellent solvents either through the control of the amount of the dimethylaminoethyl methacrylate present or the inclusion of small amounts of solubilizing agent, a sprayable solution is not necessarily obtained even though a solution highly useful for painting onto the underlying surface, where a rapidly drying skin-adhering film is desired, will result. Sprayable compositions are only obtained if the free base polymer used has a relative viscosity prior to conversion to the salt, of not appreciably over 1.60 and is present in solution in the propellent solvent in a concentration of not appreciably over 6.0 percent by weight. As a relative viscosity of at least about 1.1 is needed in order to form a non-liquid, the viscosity should preferably be within the range of about 1.20 to 1.60. Free base polymer refers to the amine-containing polymer before quaternization. Where the relative viscosity of a polymer is appreciably greater than about 1.6 or where the concentration in the propellent system is appreciably greater than 6 percent by weight, a wet jet-like stream is obtained rather than a spray. As here used, relative viscosity refers to the relative viscosity as measured at 30° C. of 1.000 gram of polymer in 100 ml. of toluene solution.

The following examples, given for the purpose of illustration only, will help to further illustrate the practice of the present invention.

EXAMPLE I

A 5-liter, 3-neck flask is provided with a reflux condenser, a mechanical stirrer, a nitrogen inlet tube, and a thermometer. The flask is charged with 487.5 grams of 2-ethylhexyl acrylate, 187.5 grams of dimethylaminoethyl methacrylate, 75.0 grams of N-tert.-butylacrylamide and 750 grams of ethyl acetate. This is a monomer charge of 65 weight percent 2-ethylhexyl acrylate, 25 percent dimethylaminoethyl methacrylate and 10 percent N-tert.-butylacrylamide. During a 35-minute period the reaction mixture is heated to 75–80° C. and stirred while a slow stream of nitrogen is swept through the apparatus. Nitrogen flow is then discontinued and 1.90 grams of 2,2'-azobis(isobutyronitrile) is added. After a short induction period, polymerization begins and the reaction mixture thickens. Stirring and heating at 80–85° C. are continued for four hours. The reaction is then discontinued and cooled to room temperature. The solids content of a sample heated for 5 hours at 105° C. is 48.9 percent. The ethyl acetate is dried from the polymer by casting the solution in a thin film on silicone-coated paper, then drying at 160° F. The polymer is very tacky and has a relative viscosity of 1.28 (1.000 g./100 mml., toluene, 30° C.). The neutral equivalent of the polymer is 614, measured by titrating samples potentiometrically with 0.1 N ethanolic hydrochloric acid in a solution of 50 percent benzene and 50 percent ethanol.

One-hundred grams of the polymer solution (48.9 percent solids) is mixed with 12.6 grams of benzyl chloride and heated on the steam pot under reflux for two hours. It is then diluted with 50 ml. ethanol, stirred and heated for an hour longer to dissolve the solid which precipitates in the reaction mixture. The reaction mixture is cooled, spread in a thin film on silicone-coated paper, and dried at 160° F. The chloride content of dried polymer is 4.25 percent as determined by potentiometric titration with 0.100 N silver nitrate in a solution of 50 percent benzene and 50 percent ethanol acidified with nitric acid. The chloride content corresponds to a degree of quaternization of 86.5 percent.

The quaternized polymer (0.2 gram) is placed in 100 ml. of water and agitated on a mechanical shaker. Approximately five minutes are required for the polymer to dissolve.

Three grams of the quaternized polymer are sealed in a pressure bottle with 65 grams of trichlorofluoromethane and 35 grams of dichlorodifluoromethane. The polymer remains undissolved after 24 hours of continuous shaking at room temperature. Another 3.0-gram sample is found to dissolve when it is shaken with 65 grams of trichlorofluoromethane, 35 grams of dichlorodifluoromethane and 5 grams of ethanol.

A 30 percent solids solution of the quaternized polymer is prepared in a blend of 71 weight percent ethyl acetate and 29 percent ethanol. Gauze pads, 2 x 2-inches in size, are affixed to the backs of twenty-five individuals by painting a film of the polymer solution on the skin and covering the wet film with the guaze pad. After 24 hours an estimation of the degree of adherence is made by inspection of each individual. A percentage adherence rating is assigned to each, based roughly on the area of the patch still adhered to the skin. The average of these readings for all individuals is 86 percent.

The polymerization is repeated using a charge of 525 grams of 2-ethylhexyl acrylate, 150 grams of dimethylaminoethyl methacrylate, 75.0 grams of N-tert.-butylacrylamide, and 750 grams of ethyl acetate. This is a monomer charge of 70 weight percent 2-ethylhexyl acrylate, 20 percent dimethylaminoethyl methacrylate and 10 percent N-tert.-butylacrylamide. After polymerization, the solids content of the reaction mixture is 49.0 percent. Relative viscosity of the free base is 1.29 and its neutral equivalent is 780.

The quaternized polymer is prepared as before by heating 100 grams of the polymer solution with 10.0 grams of benzyl chloride. The chloride content of the quaternized polymer is 3.61 percent, corresponding to a degree of quaternization of 92.1 percent.

Three grams of this polymer dissolves in a solution of 65 grams of trichlorofluoromethane and 35 grams of dichlorodifluoromethane. The addition of ethanol to the fluorocarbon solvent is unnecessary to effect solution. The quaternized polymer dissolves in water in about five minutes when 0.2 gram is shaken with 100 ml. of water.

In a skin adherence test, this quaternized polymer has an average adherence to skin of 78 percent.

EXAMPLE II

Following the procedure used in Example I for preparing the free base polymer, free base polymers are prepared using different monomer mixes, as illustrated in the following Table III:

TABLE III.—POLYMER COMPOSITION WEIGHT PERCENT

| EHA | BA | LMA | BACA | BMA | DMAEMA | Relative vis. of free base | Neut. equiv. of free base |
|---|---|---|---|---|---|---|---|
| | | 40 | | 40 | 20 | 1.24 | 797 |
| | | 70 | | | 30 | 1.24 | 568 |
| | 42 | | 28 | | 30 | 1.39 | 500 |
| | 80 | | | | 20 | 1.42 | 770 |
| | | 56.3 | | 18.7 | 25 | 1.25 | 639 |
| 65 | | | 10 | | 25 | 1.28 | 614 |

Abbreviations are as follows:
EHA: 2-ethylhexyl acrylate;
BA: n-Butyl acrylate;
LMA: Lauryl methacrylate;
BACA: N-tert.-butylacrylamide;
BMA: n-Butyl methacrylate;
DMAEMA: Dimethylaminoethyl methacrylate.

The free base polymers are then quaternized using methyl chloroacetate. The procedure of Example I is used except that a 400 percent molar excess of methyl chloroacetate is employed, based on the amine content of the free base polymer. The excess methyl chloroacetate evaporates readily when the film of quaternized polymer is dried on silicon-coated paper. All of the polymers so prepared are soluble in water, are skin adherent, and can be solubilized in a propellent solution.

EXAMPLE III

Terpolymers are prepared from ethylhexyl acrylate, N-tert.-butylacrylamide, and dimethylaminoethyl methacrylate utilizing the same procedure as set forth in Example I. The free base polymers are quaternized respectively with the quaternizing agents: methyl chloroacetate, 1-bromopentane, benzyl chloride, dimethyl sulfate. The solubility and the skin adherence of the quaternized polymers are determined in the manner described in Example I. The deterioration in skin adherence resulting from the presence of too great an amount of quaternized interpolymerized dimethylaminoethyl methacrylate is well illustrated in the following Table IV:

2. A water-soluble quaternized acrylate linear polymer of claim 1 in which the quaternized nitrogen group is represented by the formula

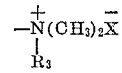

where $R_3$ has a carbon content of 1 to 8 and

X is an anion of the group consisting of halide and sulfate.

3. A water-soluble quaternized acrylate linear polymer of claim 2 in which $R_3$ contains a carboxylate group.

4. A water-soluble quaternized acrylate linear polymer of claim 2 in which $R_3$ contains a benzene ring.

5. A water-soluble quaternized acrylate linear polymer of claim 2 in which $R_3$ is composed entirely of carbon and hydrogen and in which the dimethylaminoethyl methacrylate derived portion of said polymer is present in amounts of 17 to 40 percent by weight of said polymer on a free base basis.

TABLE IV

| Polymer composition, percent | | | Neut. equiv. free base | Rel. vis. Free base | Quaternizing agent | Time of water sol., min. | Skin adherence, percent | |
|---|---|---|---|---|---|---|---|---|
| EHA | BACA | DMAEMA | | | | | 24 hr. | 48 hr. |
| 65 | 10 | 25 | 614 | 1.28 | Methyl chloroacetate | 5 | 95 | 84 |
| 50 | 10 | 40 | 377 | 1.29 | do | 1 | 28 | 9 |
| 65 | 10 | 25 | 614 | 1.28 | 1-bromopentane | 15 | 87 | 74 |
| 50 | 10 | 40 | 377 | 1.29 | do | 1 | 40 | 22 |
| 65 | 10 | 25 | 614 | 1.28 | Dimethyl sulfate | 5 | 93 | 83 |
| 50 | 10 | 40 | 377 | 1.29 | do | 1 | 3 | 1 |

Abbreviations are as follows:
EHA: 2-ethylhexyl acrylate;
BACA: N-tert.-butylacrylamide;
DMAEMA: Dimethylaminoethyl methacrylate.

Particular embodiments of the invention have been used to illustrate the same. The invention, however, is not limited to these specific embodiments. In view of the foregoing disclosure, variations or modifications thereof will be apparent, and it is intended to include within the invention all such variations and modification except as do not come within the scope of the appended claims.

Having thus described my invention, I claim:

1. A water-soluble quaternized acrylate linear polymer containing in interpolymerized form dimethylaminoethyl methacrylate and an acrylic ester of the general structure:

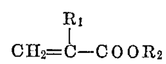

wherein $R_1$ is H or $CH_3$, and $R_2$ is an alkyl chain of 1 to 12 carbons the dimethylaminoethyl methacrylate derived portion of said polymer being present in amounts of 10 to 40 percent by weight of said polymer on a free base basis and the acrylic ester derived portion of said polymer being present in an amount of at least 50 percent by weight of said polymer on a free base basis.

6. A water-soluble quaternized acrylate linear polymer of claim 2 in which X is chlorine.

7. A water-soluble quaternized acrylate linear polymer of claim 2 in which X is bromine.

8. A water-soluble quaternized acrylate linear polymer of claim 2 in which X is sulfate.

9. A water-soluble quaternized acrylate linear polymer of claim 2 in which said polymer is a terpolymer of 2-ethylhexyl acrylate, N-tert.-butylacrylamide and dimethylaminoethyl methacrylate.

10. A quaternized acrylate linear polymer of claim 2 in organic solution in which the solvent for said polymer in said solution consists essentially of a material of the group consisting of trichlorofluoromethane; dichlorofluoromethane; 1,1,2-trichloro-1,2,2 difluoroethane; 1,1 difluoro-1-chloroethane; vinyl chloride; and dimethyl ether and 0 to 5 percent by weight of an alcohol of the group consisting of methanol, ethanol, and propanol.

11. An organic solution of claim 10 in which the solvent consists essentially of a material of the group trichlorofluoromethane; dichlorofluoromethane; 1,1,2-trichloro-1,2,2-difluoroethane; 1,1-difluoro-1-chloroethane; vinyl chloride; and dimethyl ether and in which the dimethylaminoethyl methacrylate is present in amounts of 10 to 27.5 percent by weight of said polymer on a free base basis.

12. A quaternized acrylate linear polymer of claim 10 in a pressurized sprayable organic solution of said polymer, said polymer in a free base polymer form having an intrinsic viscosity of not over 1.6 and present in said solution in a concentration of not over 6.0 percent by weight of said solution.

13. A pressurized sprayable solution of quaternized acrylate linear polymer of claim 11 in which the solvent propellent is trichlorofluoromethane and said trichlorofluoromethane is present in a propellent system in which the propellent of said system consist essentially of 75 to 25 parts by weight of trichlorofluoromethane and 25 to 75 parts by weight of dichlorodifluoromethane.

14. A quaternized linear polymer solution of claim 10 in which the anion X of said polymer is chlorine.

15. A quaternized linear polymer solution of claim 10 in which the anion X of said polymer is bromine.

16. A quaternized linear polymer solution of claim 10 in which the anion X of said polymer is sulfate.

References Cited

UNITED STATES PATENTS 2,138,763 11/1938 Graves ------------ 260—80.8
2,677,699 5/1954 Barney ------------ 260—86.3

ALLAN LIBERMAN, Primary Examiner

J. H. DERRINGTON, Assistant Examiner

U.S. Cl. X.R.

128—90; 260—33.4, 33.8, 80.73, 86.1

PO-1050
(5/69)

UNITED STATES PATENT OFFICE
CERTIFICATE OF CORRECTION

Patent No. 3,547,950 Dated December 15, 1970

Inventor(s) Robert Johns Gander

It is certified that error appears in the above-identified patent and that said Letters Patent are hereby corrected as shown below:

In Table I, under Neut. Equiv. "634" should read--434--. In Table II, "65 Freon 71" should read--65 Freon 11--, and "35 Freon 72" should read--35 Freon 12--. In Column 5, line 30, degrees is misspelled. In Column 6, in the table, "p.s.i." should read--p.s.i.g.--. The following references should be added: 2,744,884 de Benneville, 2,892,822 Gray et al, 2,949,443 Merriam et al, 3,099,636 Skiles, 3,341,505 Gander and Herzka et al, Pressurized Packaging (Aerosols) 2nd. edition, Butterworth, London, 1961, pages 20,21,303,304.

SIGNED AND
SEALED
MAR 9 1971

(SEAL)
Attest:

Edward M. Fletcher, Jr.
Attesting Officer

WILLIAM E. SCHUYLER, JR.
Commissioner of Patents